(12) United States Patent
Shim et al.

(10) Patent No.: US 9,624,912 B2
(45) Date of Patent: Apr. 18, 2017

(54) GEOTHERMAL POWER GENERATION SYSTEM AND METHOD USING HEAT EXCHANGE BETWEEN WORKING GAS AND MOLTEN SALT

(71) Applicant: KOREA INSTITUTE OF GEOSCIENCE AND MINERAL RESOURCES, Daejeon (KR)

(72) Inventors: Byoung Ohan Shim, Daejeon (KR); Hyoung Chan Kim, Daejeon (KR); Chanhee Park, Daejeon (KR)

(73) Assignee: KOREA INSTITUTE OF GEOSCIENCE AND MINERAL RESOURCES, Daejeon (KR)

( * ) Notice: Subject to any disclaimer, the term of this patent is extended or adjusted under 35 U.S.C. 154(b) by 0 days.

(21) Appl. No.: 13/718,987

(22) Filed: Dec. 18, 2012

(65) Prior Publication Data
US 2014/0102095 A1    Apr. 17, 2014

(30) Foreign Application Priority Data
Oct. 17, 2012 (KR) ........................ 10-2012-0115351

(51) Int. Cl.
F03G 7/00 (2006.01)
F03G 7/04 (2006.01)
(Continued)

(52) U.S. Cl.
CPC ................ *F03G 7/00* (2013.01); *F01K 25/00* (2013.01); *F03G 6/06* (2013.01); *F03G 7/04* (2013.01);
(Continued)

(58) Field of Classification Search
CPC ..... F03G 7/00; F03G 7/04; F03G 6/06; Y02E 10/10; Y02E 10/16; Y02E 10/46;
(Continued)

(56) References Cited

U.S. PATENT DOCUMENTS 2,532,066 A    11/1950 O
2,942,411 A *   6/1960 Hutchings .................... 60/641.8
(Continued)

FOREIGN PATENT DOCUMENTS

| EP | 0672977 A1 | 9/1995 |
|---|---|---|
| JP | 2008248837 | 10/2008 |

(Continued)

OTHER PUBLICATIONS

Jung Ryun Lee & Joon Hong Boo, Design of a Solar Thermal Storage System Employing Heat Pipes and Molten Salts, vol. 31 No. 1, Apr. 7, 2011, School of Aerospace and Mechanical Engineering, Korea Aerospace University.

*Primary Examiner* — Mark A Laurenzi
*Assistant Examiner* — Wesley Harris (57) ABSTRACT

A geothermal power generation system using heat exchange between working gas and molten salt includes a heat collector. A plurality of molten salt containers is disposed in a heat transferor at predetermined intervals from each other. A heat exchanger transfers a heat source of the heat collector to the molten salt in the plurality of molten salt containers. The heat transferor is disposed in the ground. Working gas which receives the heat source of the molten salt via heat exchange enters and exits the heat transferor. A turbine unit is connected to the heat transferor, and generates mechanical energy using energy of the working gas. A power generating unit is connected to the turbine unit, and generates electrical energy using the mechanical energy.

7 Claims, 8 Drawing Sheets

(51) Int. Cl.
*F01K 25/00* (2006.01)
*F24J 2/34* (2006.01)
*F24J 2/42* (2006.01)
*F28D 20/00* (2006.01)
*F28D 20/02* (2006.01)
*F03G 6/06* (2006.01)

(52) U.S. Cl.
CPC . *F24J 2/34* (2013.01); *F24J 2/42* (2013.01); *F28D 20/00* (2013.01); *F28D 20/0034* (2013.01); *F28D 20/0056* (2013.01); *F28D 20/021* (2013.01); *F28D 2020/006* (2013.01); *F28D 2020/0047* (2013.01); *Y02E 10/10* (2013.01); *Y02E 10/16* (2013.01); *Y02E 10/46* (2013.01); *Y02E 60/142* (2013.01); *Y02E 60/145* (2013.01); *Y02E 70/30* (2013.01)

(58) Field of Classification Search
CPC ..... Y02E 60/142; Y02E 60/145; Y02E 70/30; F01K 25/00; F24J 2/34; F24J 2/42; F28D 2020/0047; F28D 2020/006; F28D 20/00; F28D 20/021; F28D 20/0034; F28D 20/0056
USPC ........... 60/641.1–641.15, 651, 671, 676, 659
See application file for complete search history.

(56) References Cited

U.S. PATENT DOCUMENTS

| | | | | |
|---|---|---|---|---|
| 3,733,791 | A | | 5/1973 | Dravnieks |
| 3,996,099 | A | * | 12/1976 | Faugeras et al. ............. 376/360 |
| 4,206,608 | A | * | 6/1980 | Bell ................................ 60/698 |
| 4,251,291 | A | | 2/1981 | Gomez |
| 4,347,703 | A | * | 9/1982 | Lukasavage ................. 60/641.6 |
| 5,272,879 | A | * | 12/1993 | Wiggs .............................. 60/676 |
| 6,668,555 | B1 | * | 12/2003 | Moriarty ...................... 60/641.8 |
| 8,960,148 | B2 | | 2/2015 | McGinnis |
| 2005/0178187 | A1 | | 8/2005 | Nakagawa |
| 2007/0033980 | A1 | | 2/2007 | Nishimura |
| 2008/0289795 | A1 | * | 11/2008 | Hardin et al. .................. 165/45 |
| 2009/0211727 | A1 | * | 8/2009 | Yin et al. ......................... 165/45 |
| 2010/0024421 | A1 | * | 2/2010 | Litwin et al. ................ 60/641.8 |
| 2010/0242474 | A1 | * | 9/2010 | Berger et al. ................ 60/641.2 |
| 2012/0001429 | A1 | * | 1/2012 | Saar et al. ....................... 290/52 |
| 2012/0124998 | A1 | * | 5/2012 | Newman ...................... 60/641.2 |
| 2012/0276433 | A1 | | 11/2012 | Fujiwara |
| 2015/0010875 | A1 | | 1/2015 | Raade et al. |

FOREIGN PATENT DOCUMENTS

| | | |
|---|---|---|
| KR | 1020120003234 A | 1/2012 |
| KR | 1020120054199 A | 5/2012 |
| KR | 101166684 B1 | 7/2012 |

* cited by examiner

GEOTHERMAL POWER GENERATION SYSTEM AND METHOD USING HEAT EXCHANGE BETWEEN WORKING GAS AND MOLTEN SALT

BACKGROUND OF THE INVENTION

Field of the Invention

The present invention relates, in general, to a geothermal power generation system and method using heat exchange between working gas and molten salt, and more particularly, to a geothermal power generation system and method in which working gas undergoes heat exchange in the ground.

Description of the Related Art

Geothermal power generation is a type of power generation that generates electricity by accepting heat in the form of steam or hot water from a hot subterranean layer. Subterranean heat is a type of energy that is contained in hot water, hot rocks or the like found underground in regions ranging from relatively shallow regions to regions located several kilometers beneath the surface of the Earth.

When hot steam is obtained from these underground regions, the hot steam is introduced to a steam turbine to rotate the turbine at a high speed, so that a power generator connected to the turbine generates electricity. If the steam which erupts from underground contains only a small amount of moisture, it can be sent directly to the turbine. If the steam erupts along with a large amount of hot water, the hot water is sent to a heat exchanger in which the water is vaporized and is then sent to the turbine as steam. In addition, when water has a low temperature, a liquid that has a lower boiling point is vaporized and is then sent to the turbine.

Geothermal power generation does not need fuel in principle and is a clean energy source that is free from pollution attributable to the combustion of fuel. However, noncondensable gas that erupts from a geothermal well contains a small amount of hydrogen sulfide. The eruption of hydrogen sulfide is not problematic at present since the concentration of hydrogen sulfide is low and below environmental standards. However, desulfurization equipment will be required if a large amount of hydrogen sulfide erupts in the future. In addition, after power generation, all of the hot water is returned to the underground region from whence it came since it contains a small amount of arsenic. However, if an economical dearsenic technology is established, the hot water will also be usable after power generation as a valuable low-temperature thermal energy resource.

The majority of costs for geothermal power generation include a cost for construction of a geothermal power plant and a cost for excavation of a geothermal well. The costs for geothermal power generation vary depending on the quality and type of geothermal power generation. Geothermal power generation has an advantage of economic competitiveness, although a typical geothermal power plant has a smaller scale than a thermal power plant or an atomic power plant. Geothermal power generation is also characterized as a small and locally-distributed energy source.

Figure 1:
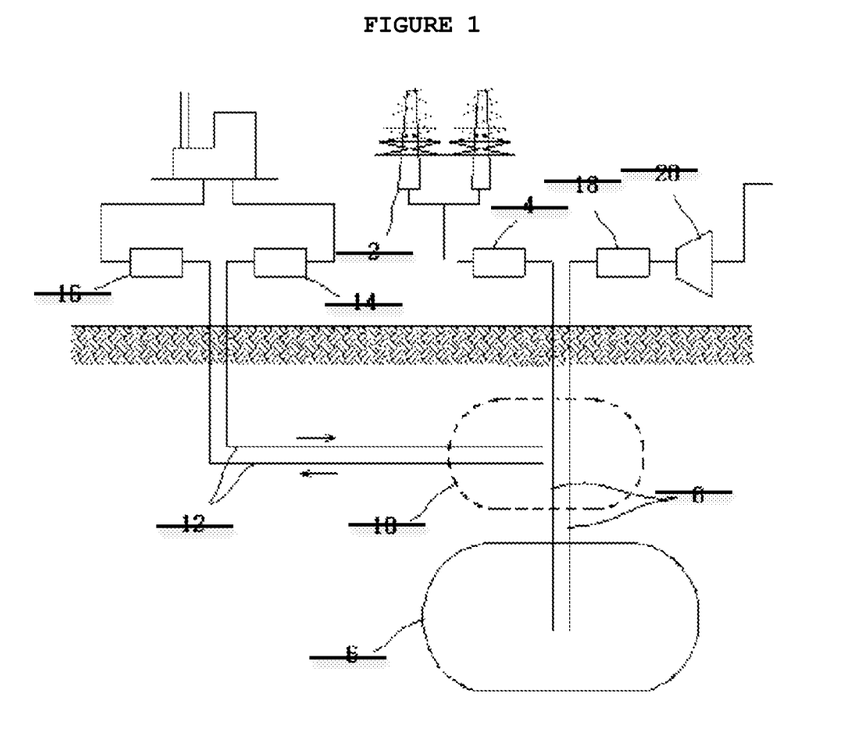
FIG. 1 a schematic view showing the configuration of a geothermal power generation system using high-temperature and high-pressure compressed air.

FIG. 1 a schematic view showing the configuration of a geothermal power generation system using high-temperature and high-pressure compressed air.

In an example, Korean Patent Application No. 10-2010-0115466 introduces a geothermal power generation system using high-temperature and high-pressure compressed air. As shown in FIG. 1, in the system of this application, a cooling unit which reduces temperature is removed from a rear end of a compressor 4, and artificial geothermal power generation is carried out using the characteristic of high-temperature and high-pressure compressed air that is produced by the compressor 4. In this fashion, the efficiency of the power generation using the compressed air can be improved.

Figure 2:
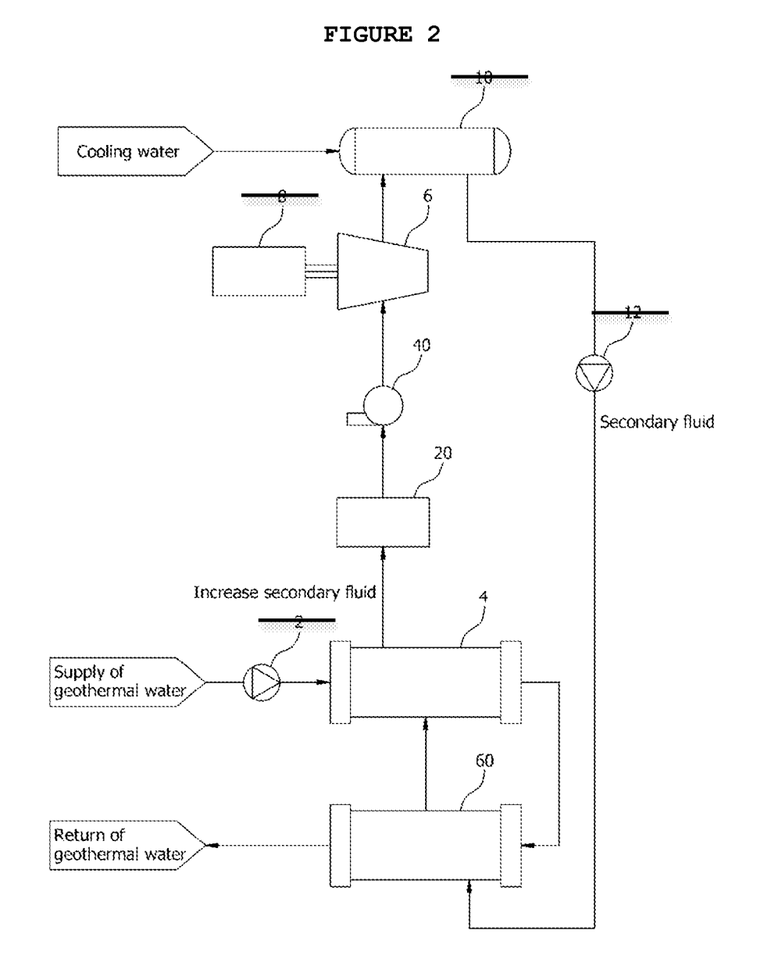
FIG. 2 is a schematic view showing the configuration of a geothermal power generation system of the related art.

FIG. 2 is a schematic view showing the configuration of a geothermal power generation system of the related art.

In addition, Korean Patent Application No. 10-2010-0063987 introduces a low-temperature geothermal power generation system. As shown in FIG. 2, the geothermal power generation system of this application includes a superheater 20, a post pressure pump 40 and a preheater 60 in order to carry out geothermal power generation using geothermal water having a temperature of 100° C. or less. In this system, it is possible to increase the efficiency of a carburetor 4 by increasing the temperature and enthalpy of secondary fluid by a predetermined degree by actuating the preheater 60 using the remaining heat of geothermal water that is supplied from the carburetor 4, increase pressure by increasing the temperature of the secondary fluid that is vaporized by the superheater 20, and increase the efficiency of the carburetor and maintain the flow rate of the superheater 20 by increasing the pressure of the secondary fluid that is introduced into a turbine 6 by the post pressure pump 40 and decreasing the pressure of the superheater 20. Therefore, this system can effectively generate electricity using geothermal water that has a relatively low temperature.

In geothermal power generation, hot water or steam that has been drawn up from underground is not renewable energy in the strictest sense. Since the amount of subterranean heat that leaks during geothermal power generation is greater than the recharging capacity of a reservoir, the amount of heat stored beneath the surface of the Earth is currently reducing. Although it will take a long time, when subterranean hot water or steam is exhausted and hot rock layers are cooled, no heat can be drawn up from underground any longer. It is necessary to convert other types of energy into geothermal energy which can be used for geothermal power generation. Working gas such as carbon dioxide ($CO_2$) can be used for geothermal power generation since it does not easily react with substances in the ground unlike water and can more effectively transfer heat stored in the rock bed through cracks in the ground.

SUMMARY OF THE INVENTION

Accordingly, the present invention has been made keeping in mind the above problems occurring in the related art, and the present invention is intended to propose a geothermal power generation system and method using heat exchange between working gas and molten salt which can generate electricity by circulating working gas in the ground having a predetermined dimension and rotating a turbine via heat exchange between heat stored in molten salt and heat stored in the ground.

In order to achieve the above object, according to one aspect of the present invention, there is provided a geothermal power generation system using heat exchange between working gas and molten salt. The geothermal power generation system includes a heat collector; a plurality of molten salt containers which contain molten salt therein, the plurality of molten salt containers being disposed in a heat transferor at predetermined intervals from each other; a heat exchanger which transfers a heat source of the heat collector to the molten salt in the plurality of molten salt containers; the heat transferor disposed in the ground, wherein working gas which receives the heat source of the molten salt via heat exchange enters and exits the heat transferor; a turbine unit connected to the heat transferor, the turbine unit generating mechanical energy using energy of the working gas; and a power generating unit connected to the turbine unit, the power generating unit generating electrical energy using the mechanical energy.

In an exemplary embodiment, the heat collector may be implemented as a flat panel-shaped heat collecting tube In an exemplary embodiment, each of the plurality of molten salt containers may be implemented as a linear tube having an upper section connected to the heat exchanger and a lower section inserted into the heat transferor.

In an exemplary embodiment, the heat transferor may include one or more gas inlet holes through which the working gas enters the heat transferor; and one or more gas outlet holes through which the working gas exits the heat transferor. The working gas enters the heat transferor through the gas inlet holes, receives the heat source of the molten salt while flowing through cracks formed inside the heat transferor, exiting the heat transferor through the gas outlet holes Here, the upper and side surfaces of the heat transferring unit may be grouted such that the working gas that has entered the heat transferor is prevented therefrom, so that the working gas that has undergone heat exchange exits through the gas outlet holes.

In addition, the working gas may be implemented as carbon dioxide.

According to another aspect of the present invention, there is provided a geothermal power generation system using heat exchange between working gas and molten salt. The geothermal power generation system includes a heat collector; a plurality of molten salt containers which contain molten salt therein, the plurality of molten salt containers being disposed in a heat transferor at predetermined intervals from each other; a heat exchanger which transfers a heat source of the heat collector to the molten salt in the plurality of molten salt containers; the heat transferor disposed in the ground, wherein working gas which receives the heat source of the molten salt via heat exchange enters and exits the heat transferor; a latent heat collector disposed in the heat transferor while surrounding the plurality of molten salt containers, the latent heat collector collecting latent heat that is produced following phase changes in the molten salt; a first turbine unit connected to the heat transferor, the first turbine unit generating mechanical energy using energy of the working gas; a second turbine unit connected to the latent heat collector, the second turbine unit generating mechanical energy using steam energy that is generated by the latent heat collector; a first power generating unit connected to the first turbine unit, the first power generating unit generating electrical energy using the mechanical energy of the first turbine unit; and a second power generating unit connected to the second turbine unit, the second power generating unit generating electrical energy using the mechanical energy of the second turbine unit.

In an exemplary embodiment, the heat transferor may include one or more gas inlet holes through which the working gas enters the heat transferor; and one or more gas outlet holes through which the working gas exits the heat transferor. The working gas enters the heat transferor through the gas inlet holes, receives the heat source of the molten salt while flowing through cracks formed inside the heat transferor, exiting the heat transferor through the gas outlet holes.

In an exemplary embodiment, the latent heat collector may employ a Rankine cycle in which heat exchange is carried out by circulating water.

In an exemplary embodiment, the latent heat collector may employ a Brayton cycle in which heat exchange is carried out by circulating gas.

According to a further aspect of the present invention, there is provided a geothermal power generation method using heat exchange between working gas and molten salt. The geothermal power generation method includes the following steps of: collecting a heat source into a heat collector; transferring the heat source of the heat collector to molten salt via heat exchange; transferring the heat source of the molten salt to working gas via heat exchange; generating mechanical energy using steam energy of the working gas; and generating electrical energy using the mechanical energy.

According to further another aspect of the present invention, there is provided a geothermal power generation method using heat exchange between working gas and molten salt. The geothermal power generation method includes the following steps of: collecting a heat source into a heat collector; transferring the heat source of the heat collector to molten salt via heat exchange; transferring the heat source of the molten salt to working gas via heat exchange; collecting latent heat via heat exchange, the latent heat being produced following phase changes of the molten salt; generating mechanical energy using energy of the working gas and steam energy that is generated by the latent heat; and generating electrical energy using the mechanical energy.

According to the geothermal power generation system and method using heat exchange between working gas and molten salt according to the present invention, it is possible to generate electricity by circulating working gas in the ground having a predetermined dimension and rotating a turbine via heat exchange between heat stored in molten salt and heat stored in the ground.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Reference will now be made in greater detail to an exemplary embodiment of the present invention, an example of which is illustrated in the accompanying drawings. Wherever possible, the same reference numerals will be used throughout the drawings and the description to refer to the same or like parts. In the following description of the present invention, detailed descriptions of known functions and components incorporated herein will be omitted when they may make the subject matter of the present invention unclear.

Figure 3:
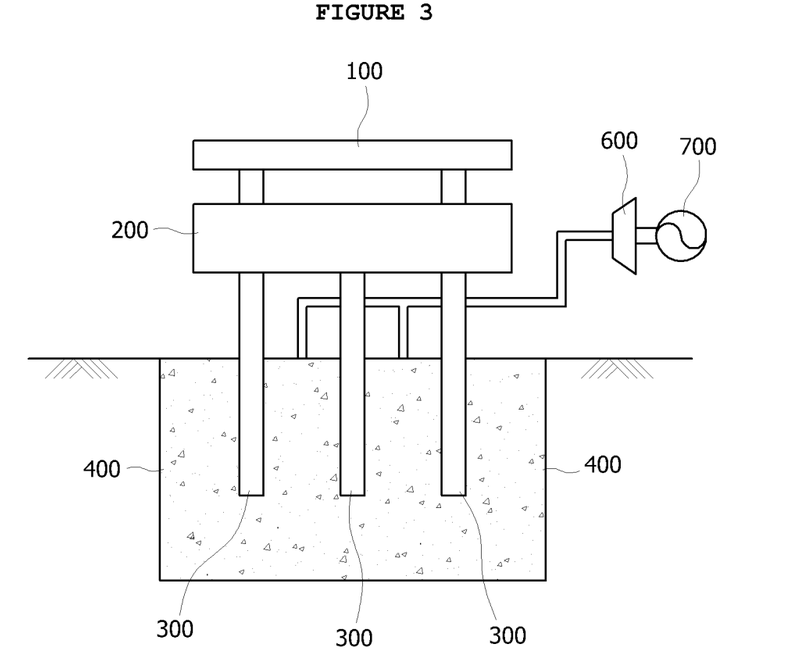
FIG. 3 is a configuration view showing a geothermal power generation system using heat exchange between working gas and molten salt according to a first exemplary embodiment of the present invention.

FIG. 3 is a configuration view showing a geothermal power generation system using heat exchange between working gas and molten salt according to a first exemplary embodiment of the present invention.

As shown in FIG. 3, the geothermal power generation system using heat exchange between working gas and molten salt according to the first exemplary embodiment of the present invention includes a heat collector 100, a heat exchanger 200, a plurality of molten salt containers 300, a heat transferor 400, a turbine unit 600 and a power generating unit 700.

The heat collector 100 may be implemented as a heat collecting tube having the shape of a flat panel which can collect waste heat or solar heat.

In an example, in order to collect solar heat, the heat collector 10 can be configured such that a transparent outer layer which allows light to pass through surrounds a black inner structure. With this structure, the heat collector 10 can convert solar energy into heat energy.

Specifically, when light energy from the sun enters the interior of the flat heat collecting tube, the light energy is converted into infrared (IR) radiation while colliding against the black inner structure. Since the IR radiation does not pass through the transparent outer layer, the inside becomes gradually hotter. In addition, water can flow inside the flat heat collecting tube, and absorb a heat source that has been collected inside the flat heat collecting tube so that the heat source can be transferred to the heat exchanger 200 which will be described later.

The heat exchanger 200 can transfer the heat source in the heat collector 10 to molten salt in the molten salt containers 300 which will be described later via heat exchange, thereby heating the molten salt.

The molten salt containing units 300 contain the molten salt therein, and can be disposed in the heat transferor 400 which will be described later, at predetermined intervals from each other.

Specifically, each of the molten salt containers 300 can be configured as a linear tube. The upper section of the molten salt containing unit 300 is connected to the heat exchanger 200 such that the molten salt can receive the heat source from the heat exchanger 200, and the lower section of the molten salt container 300 is inserted into the heat transferor 400 such that the heat source of the molten salt can be transferred to the heat transferor 400.

The heat transferor 400 is disposed in the ground, such that working gas which receives the heat source of the molten salt can enter and exit the heat transferor 400.

Figure 4:
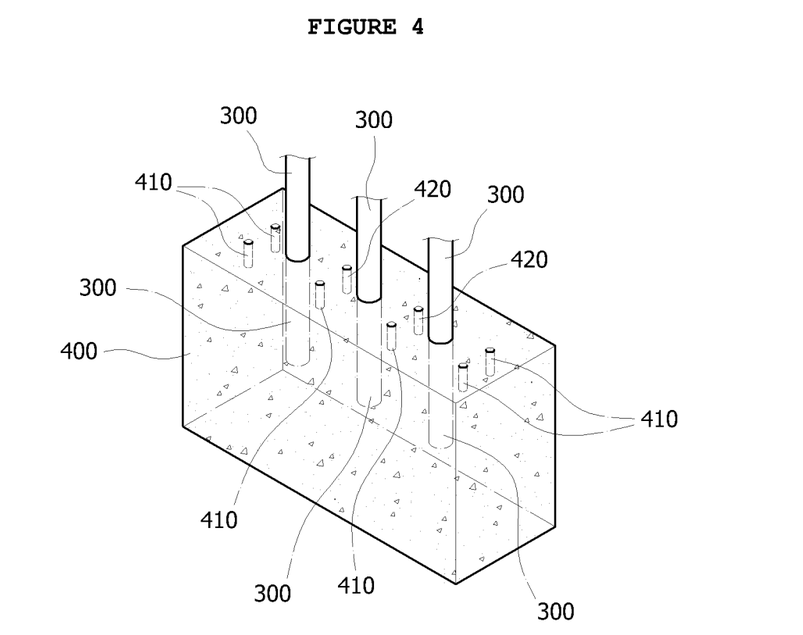
FIG. 4 is a configuration view of the heat transferor shown in FIG. 3.

FIG. 4 is a configuration view of the heat transferor 400 shown in FIG. 3.

Specifically, as shown in FIG. 4, the heat transferor 400 includes one or more gas inlet holes 410 through which the working gas enters and one or more gas outlet holes 420 through which the working gas exits. Here, the heat transferor 400 can be configured such that the gas inlet holes 410 are opened and the gas outlet holes 420 are connected to the turbine unit 600 which will be described later.

After the working gas has been introduced into the heat transferor 400 through the gas inlet holes 410, the gas inlet holes 410 can be closed in order to prevent the working gas from exiting.

Figure 5:
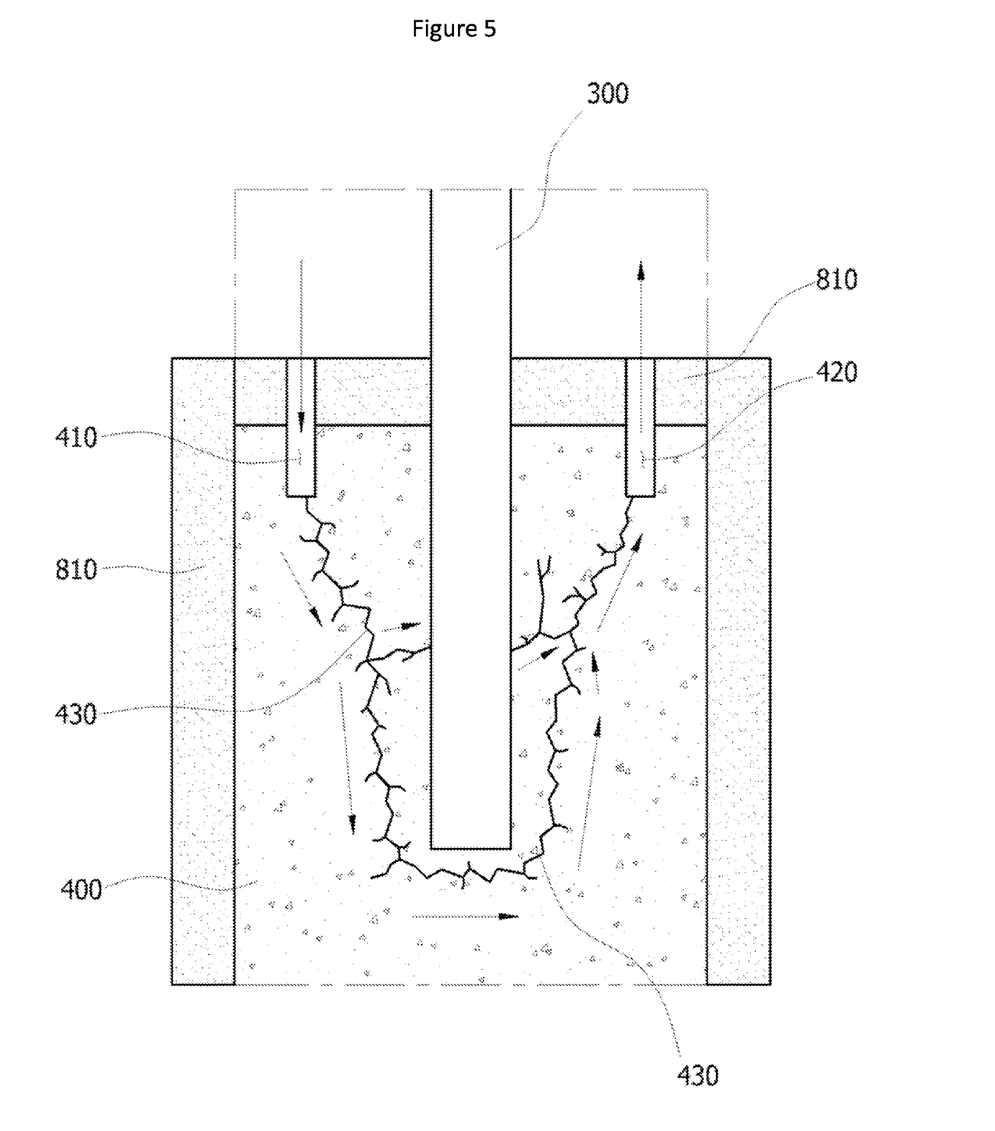
FIG. 5 is a schematic view showing the state in which working gas flows through cracks formed inside one of the heat transferors according to the present invention.

FIG. 5 is a schematic view showing the state in which working gas flows through cracks formed inside one of the heat transferors according to the present invention.

Here, the working gas that enters and exits the heat transferor can be implemented as carbon dioxide ($CO_2$) which collects heat at a high efficiency and does not cause the problem of pollution. As shown in FIG. 5, the working gas enters the interior of the heat transferor 400 through the gas inlet holes 410, receives the heat source of the molten salt while flowing through cracks 430 formed inside the heat transferor 400, exits the heat transferor 400 through the gas outlet holes 420, and then flows toward the turbine 600.

The upper and side surfaces of the heat transferor 400 can be grouted with a grouting material 810 which prevents the working gas that has entered the heat transferor 400 from leaking, so that the working gas that has undergone heat exchange can exit through the gas outlet holes 420.

The turbine unit 600 is connected to the heat transferor 400, and can generate mechanical energy using the energy of the working as that exits the heat transferor 400.

The power generating unit 700 is connected to the turbine unit 600, and can generate electrical energy using the mechanical energy of the turbine unit 600.

A detailed description will be given below of a geothermal power generation system using heat exchange between working gas and molten salt according to a second exemplary embodiment of the present invention.

Figure 6:
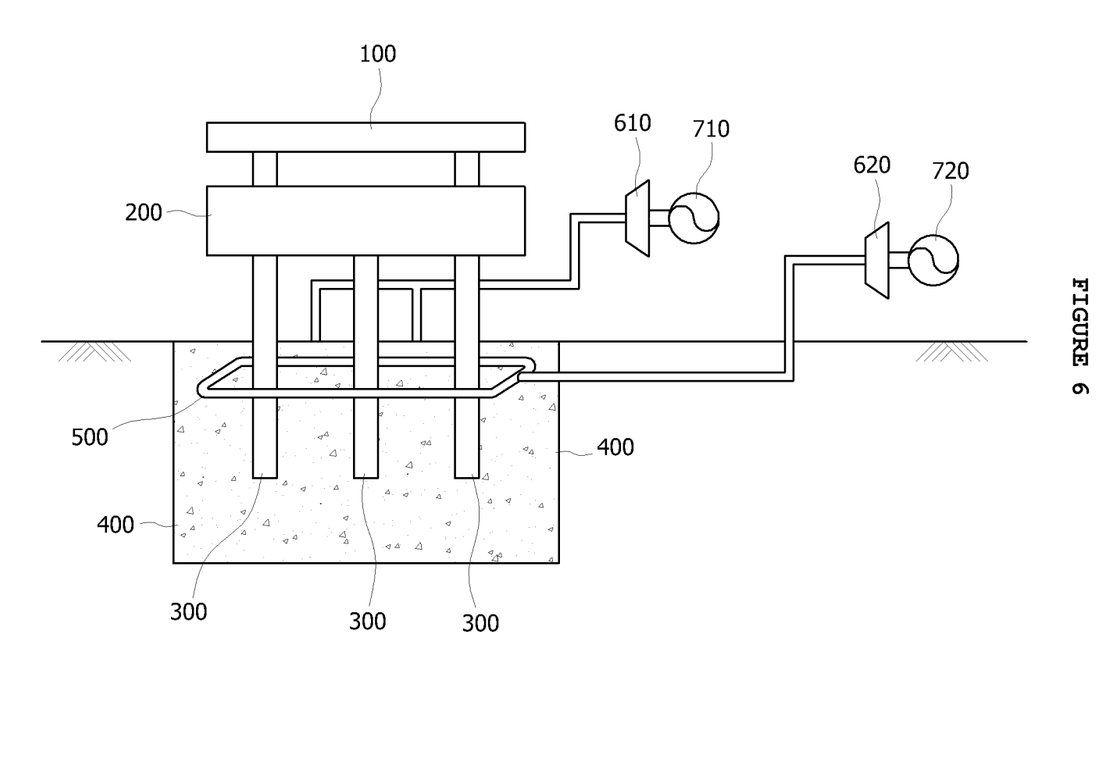
FIG. 6 is a configuration view showing a geothermal power generation system using heat exchange between working gas and molten salt according to a second exemplary embodiment of the present invention.

FIG. 6 is a configuration view showing the geothermal power generation system using heat exchange between working gas and molten salt according to the second exemplary embodiment of the present invention.

As shown in FIG. 6, the geothermal power generation system using heat exchange between working gas and molten salt according to the second exemplary embodiment of the present invention includes a heat collector 100, a heat exchanger 200, a plurality of molten salt containers 300, a heat transferor 400, a latent heat collector 500, a first turbine unit 610, a second turbine unit 620, a first power generating unit 710 and a second power generating unit 720.

Detailed descriptions of the heat collector 100, the heat exchanger 200, the plurality of molten salt containers 300 and the heat transferor 400 will be omitted since they have the same configurations and functions as the heat collector, the heat exchanger, the molten salt containers and the heat transferor of the geothermal power generation system using heat exchange between working gas and molten salt according to the first embodiment of the present invention.

The latent heat collector 500 is disposed underground while surrounding the molten salt containers 300 such that it can collect latent heat via heat exchange, the latent heat being produced by phase changes in the molten salt.

Specifically, the latent heat collector 500 can employ the Rankine cycle in which heat exchange is carried out by circulating water as a first example. The latent heat collector 500 can collect latent heat via heat exchange by circulating water accompanied with phase changes between steam and liquid through adiabatic compression, isobaric heating, adiabatic expansion and isobaric heat dissipation.

Alternatively, as a second example, the latent heat collector 500 can employ the Brayton cycle in which heat exchange is carried out by circulating gas. The latent heat collector 500 can collect latent heat via heat exchange by circulating compressed gas, and then produce combustion gas by injecting fuel thereto.

The first turbine unit 610 is connected to the heat transferor 400, and can generate mechanical energy using the energy of the working gas that exits the heat transferor 400.

The second turbine unit 620 is connected to the latent heat collector 500, and can generate mechanical energy using the energy of steam that is produced in the latent heat collector 500.

The first power generating unit 710 is connected to the first turbine unit 610, and can generate electrical energy using the mechanical energy of the first turbine unit 610.

The second power generating unit 720 is connected to the second turbine unit 620, and can generate electrical energy using the mechanical energy of the second turbine unit 620.

A detailed description will be given below of a geothermal power generation method using heat exchange between working gas and molten salt according to the first exemplary embodiment of the present invention.

Figure 7:
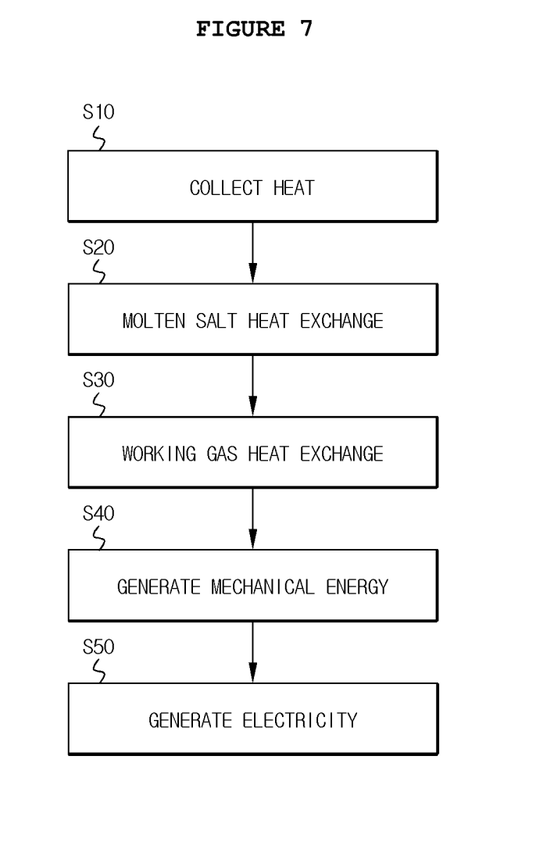
FIG. 7 is a block diagram showing a geothermal power generation method using heat exchange between working gas and molten salt according to the first exemplary embodiment of the present invention.

FIG. 7 is a block diagram showing the geothermal power generation method using heat exchange between working gas and molten salt according to the first exemplary embodiment of the present invention.

As shown in FIG. 7, the geothermal power generation method using heat exchange between working gas and molten salt according to the first exemplary embodiment of the present invention includes a heat collecting step S10, a molten salt heat exchanging step S20, a working gas heat exchanging step S30, a mechanical energy generating step S40 and an electricity generating step S50.

The heat collecting step S10 is the step of collecting heat sources to the heat collector 100 shown in FIG. 3. At the heat collecting step S10, the heat collector 100 which is implemented as a flat heat collecting tube can collect waste heat or solar heat.

The molten salt heat exchanging step S20 is the step of transferring a heat source in the heat collector 100 to molten salt via heat exchange.

Specifically, at the molten salt heat exchanging step S20, the heat exchanger 200 can heat molten salt in the molten salt containers 300 by transferring heat sources in the heat collector 100 to the molten salt.

The working gas heat exchanging step S30 is the step of transferring heat sources of the molten salt to working gas via heat exchange.

Specifically, at the working gas heat exchanging step S30, it is possible to transfer a heat source of the molten salt to working gas which enters and exits the heat transferor 400. The working gas can enter the heat transferor 400 through the gas inlet holes 410 of the heat transferor 400, receives and is heated by the heat source of the molten salt while flowing through the cracks 430 formed inside the heat transferor 400, exits the heat transferor 400 through the gas outlet holes 420, and then flows toward the turbine 600.

The mechanical energy generating step S40 is the step at which the turbine unit 600 generates mechanical energy using the steam energy of the working gas.

The electricity generating step S50 is the step at which the power generating unit 700 generates electrical energy using the mechanical energy.

A detailed description will be given below of a geothermal power generation method using heat exchange between working gas and molten salt according to the second exemplary embodiment of the present invention.

Figure 8:
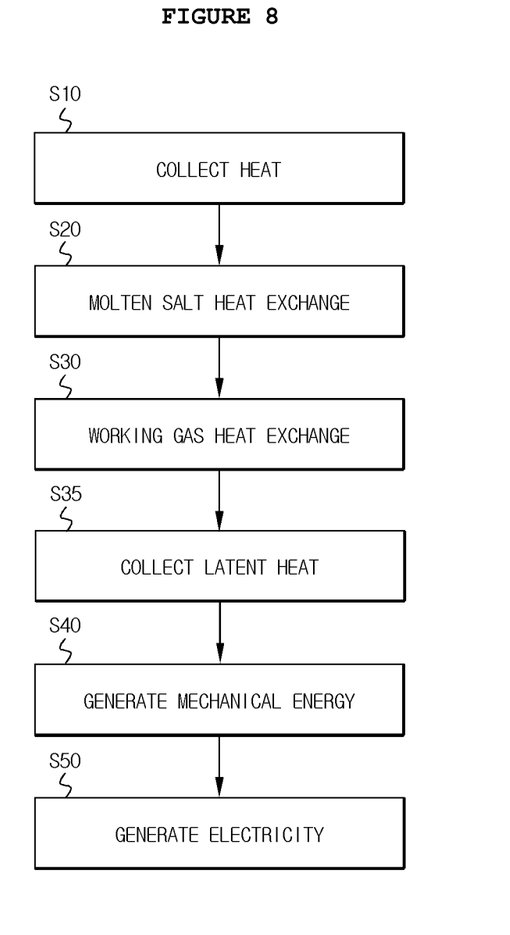
FIG. 8 is a block diagram showing a geothermal power generation method using heat exchange between working gas and molten salt according to the second exemplary embodiment of the present invention.

FIG. 8 is a block diagram showing the geothermal power generation method using heat exchange between working gas and molten salt according to the second exemplary embodiment of the present invention.

As shown in FIG. 8, the geothermal power generation method using heat exchange between working gas and molten salt according to the second exemplary embodiment of the present invention includes a heat collecting step S10, a molten salt heat exchanging step S20, a working gas heat exchanging step S30, a latent heat collecting step S35, a mechanical energy generating step S40 and an electricity generating step S50

Detailed descriptions of the heat collecting step S10, the molten salt heat exchanging step S20 and the working gas heat exchanging step S30 will be omitted since they have the same flows and functions as the collecting step, the molten salt heat exchanging step and the working gas heat exchanging step of the geothermal power generation method using heat exchange between working gas and molten salt according to the first exemplary embodiment of the present invention.

The latent heat collecting step S35 is the step of collecting latent heat via heat exchange, the latent heat being produced following phase changes in molten salt.

Specifically, at the latent heat collecting step S35, the latent heat collector 500 which is disposed in the heat transferor 400 while surrounding the molten salt containers 300, as shown in FIG. 6, can collect the latent heat that is generated following phase changes in the molten salt. The latent heat collector 500 can collect the latent heat via heat exchange by circulating water or gas.

The mechanical energy generating step S40 is the step at which the first turbine unit 610 generates mechanical energy using the energy of the working gas or the second turbine 620 generates mechanical energy using the energy of steam that is produced by latent heat.

The electricity generating step S50 is the step at which the first power generating unit 710 and the second power generating unit 720 generate power using the mechanical energy.

Although the geothermal power generation system and method using heat exchange between working gas and molten salt according to exemplary embodiments of the present invention have been described in conjunction with the accompanying drawings, those skilled in the art will appreciate that various modifications, additions and substitutions are possible, without departing from the scope and spirit of the present invention as disclosed in the accompanying claims.

What is claimed is:
1. A power generation system, comprising:
a heat collector configured to collect heat;
a heat transferor disposed in the ground, the heat transferor being configured for a flow of a working gas therethrough;
at least one molten salt container containing a molten salt therein, the at least one molten salt container being disposed in the heat transferor the at least one molten salt container comprising a linear tube having an upper section and a lower section;

a heat exchanger connected to the upper section of the at least one molten salt container, the heat exchanger transferring heat from the heat collector to the molten salt in the at least one molten salt container, whereby the at least one molten salt container heats the working gas;

a turbine connected to the heat transferor, the turbine generating mechanical energy using energy of the heated working gas; and a power generator connected to the turbine, the power generator generating electrical energy using the mechanical energy;

wherein upper and side surfaces of the heat transferor are grouted such that the working gas that has entered the heat transferor is prevented from exiting via the upper and side surfaces.

2. The power generation system of claim 1, wherein the heat transferor comprises:

at least one gas inlet hole through which the working gas enters the heat transferor; and at least one gas outlet hole through which the working gas exits the heat transferor, wherein the working gas entering the heat transferor through the at least one gas inlet hole, and exiting through the at least one gas outlet hole, receives heat from the molten salt while flowing through cracks formed inside the heat transferor.

3. The power generation system of claim 2, wherein the working gas comprises carbon dioxide.

4. The power generation system of claim 1, wherein the heat collected by the heat collector includes at least one of waste heat and solar heat.

5. The power generation system of claim 1, wherein the at least one molten salt container includes a plurality of molten salt containers spaced apart from one another in the heat transferor.

6. A method of generating power comprising:

collecting heat with a heat collector;

flowing a working gas through a heat transferor disposed in the ground, the heat collector including therein at least one molten salt container, the at least one molten salt container containing a molten salt, and having a lower end and an upper end, the heat transferor including grout on upper and side surfaces to prevent escape of the working gas through the upper and side surfaces;

transferring the heat to the upper section of the at least one molten salt container, thereby heating the molten salt in the at least one molten salt container;

transferring the heat from the at least one molten salt to the working gas in the heat transferor;

transferring the heated working gas from a gas outlet hole to a turbine, the turbine generating mechanical energy; and transferring the mechanical energy to a power generator, the power generator generating the power.

7. The method of claim 6, wherein the heat is transferred from the heat collector to the at least one molten salt container via a heat exchanger connected to the upper end of the at least one molten salt container.

* * * * *